US011258645B2

(12) United States Patent
Li et al.

(10) Patent No.: US 11,258,645 B2
(45) Date of Patent: *Feb. 22, 2022

(54) METHOD AND APPARATUS FOR SEQUENCE GENERATION

(71) Applicant: ZTE CORPORATION, Guangdong (CN)

(72) Inventors: Yong Li, Guangdong (CN); Zhaohua Lu, Guangdong (CN); Yijian Chen, Guangdong (CN); Chuangxin Jiang, Guangdong (CN); Yu-Ngok Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 10 days.

This patent is subject to a terminal disclaimer.

(21) Appl. No.: 16/783,038

(22) Filed: Feb. 5, 2020

(65) Prior Publication Data

US 2020/0177427 A1 Jun. 4, 2020

Related U.S. Application Data

(63) Continuation of application No. 16/200,359, filed on Nov. 26, 2018, now Pat. No. 10,594,528, which is a
(Continued)

(51) Int. Cl.
*H04L 27/26* (2006.01)
*H04B 7/0413* (2017.01)
(Continued)

(52) U.S. Cl.
CPC ....... *H04L 27/2613* (2013.01); *H04B 7/0413* (2013.01); *H04J 13/10* (2013.01);
(Continued)

(58) Field of Classification Search
CPC ................ H04L 27/26; H04L 27/2613; H04L 5/0007; H04B 7/0413; H04J 13/10; H04W 72/0453
See application file for complete search history.

(56) References Cited

U.S. PATENT DOCUMENTS 9,787,514 B2 * 10/2017 Yoon ..................... H04L 5/0035
9,900,134 B2    2/2018 Kwon
(Continued)

FOREIGN PATENT DOCUMENTS

CN    101272232 A    9/2008
CN    102130875 A    7/2011
(Continued)

OTHER PUBLICATIONS

Cisco, et al., "Air Interface Working Group; Verizon 5th Generation Radio Access; Physical channels and modulation (Release 1)", TS V5G.211 V1.7, Oct. 31, 2016, 84 pages.
(Continued)

*Primary Examiner* — Brian D Nguyen
(74) *Attorney, Agent, or Firm* — Duane Morris LLP

(57) ABSTRACT

A method and apparatus for generating a reference signal sequence for performing channel estimation. In one embodiment, the method includes: determining an initialization value; limiting the initialization value to be less than a predetermined positive integer M to provide a limited initialization value; mapping the limited initialization value into an initialization sequence having a predetermined number L of sequence values; providing the initialization sequence to a pseudo-random number generator to generate a pseudo-random number sequence; and generating the RS sequence based on the PRNS.

10 Claims, 7 Drawing Sheets

Related U.S. Application Data continuation of application No. PCT/CN2017/088494, filed on Jun. 15, 2017.

(51) Int. Cl.
*H04J 13/10* (2011.01)
*H04L 5/00* (2006.01)
*H04W 72/04* (2009.01)

(52) U.S. Cl.
CPC ............ *H04L 5/0007* (2013.01); *H04L 27/26* (2013.01); *H04W 72/0453* (2013.01)

(56) References Cited

U.S. PATENT DOCUMENTS

| | | |
|---|---|---|
| 2010/0189032 A1 | 7/2010 | Chen |
| 2013/0195069 A1 | 8/2013 | Frederiksen et al. |
| 2013/0301452 A1 | 11/2013 | Yoon et al. |
| 2015/0085785 A1 | 3/2015 | Kim |
| 2016/0173249 A1 | 6/2016 | Kwon |
| 2016/0173255 A1 | 6/2016 | Lee |
| 2017/0078903 A1 | 3/2017 | Kusashima |
| 2019/0044669 A1 | 2/2019 | Davydov |
| 2020/0245309 A1* | 7/2020 | Xia .................. H04W 72/0446 |
| 2020/0259694 A1* | 8/2020 | Lee ........................ H04L 5/0053 |
| 2020/0374078 A1* | 11/2020 | Gao ........................ H04L 5/0057 |
| 2021/0013983 A1* | 1/2021 | Iwai ...................... H04B 17/354 |
| 2021/0045118 A1* | 2/2021 | Inoue .................... H04L 5/0094 |
| 2021/0058746 A1* | 2/2021 | Markhovsky ........... H04B 17/27 |
| 2021/0075660 A1* | 3/2021 | Yoon ................... H04L 27/2613 |
| 2021/0136712 A1* | 5/2021 | Park ....................... H04L 5/0051 |

FOREIGN PATENT DOCUMENTS

| | | |
|---|---|---|
| CN | 102573061 A | 7/2012 |
| CN | 102437987 A | 5/2015 |
| CN | 106465374 A | 2/2017 |
| KR | 20070110613 A1 | 11/2007 |
| KR | 20100088555 A1 | 8/2010 |
| WO | 2014088654 A1 | 6/2014 |

OTHER PUBLICATIONS

Samsung, "On Gold Sequence Initialization", 3GPP TSG RAN WG1 Meeting #52bis, Shenzen,China, Mar. 31-Apr. 4, 2008, R1-081229, 5 pages.

Farooq Khan "9. Cell search and reference signals" LTE for 4G Mobile Broadband, Jan. 1, 2009, Cambridge University Press, USA ISBN:978-0-511-51666-5, 39 pages.

* cited by examiner

METHOD AND APPARATUS FOR SEQUENCE GENERATION

RELATED APPLICATION

The present application is a continuation of U.S. patent application Ser. No. 16/200,359, filed Nov. 26, 2018, which is a bypass continuation based on PCT Application No. PCT/CN2017/088494, filed on Jun. 15, 2017 and entitled "Method and Apparatus for Sequence Generation," the contents of both of which are incorporated by reference herein in their entirety.

TECHNICAL FIELD

The disclosure relates generally to wireless communications and, more particularly, to systems and methods for generating reference signal sequences for wireless communications.

BACKGROUND

The 5th generation New Radio (5G NR) wireless communication network is the proposed next generation wireless communication network for which telecommunications standards our currently being developed. The 5G NR network will be an end-to-end ecosystem to enable a fully mobile and connected society. The Next Generation Mobile Networks Alliance estimates that 5G NR networks will be rolled out by 2020 to meet business and consumer demands. In addition to providing faster speeds, it is predicted that 5G NR networks also will need to meet new use cases, such as the Internet of Things (internet connected devices), as well as broadcast-like services and lifeline communication in times of natural disaster. Carriers, chipmakers, original equipment manufacturers (OEMS) and out-sourced assembly and test companies (OSATs), have been preparing for this next-generation (5G) wireless standard, as mobile systems and base stations will require new and faster application processors, basebands and RF devices. Although updated standards that define capabilities beyond those defined in the current 4G standards are under consideration, those new capabilities have been grouped under the current ITU-T 4G standards.

In the current standards, the reference signal (RS) is typically generated in the base station (BS) and then transmitted to a User Equipment (UE) device to perform channel estimation. The RS is then used by a receiving UE device to perform channel estimation measurements such as reference signal received power (RSRP) measurements. Thereafter, the UE device generates a report containing the measurement results, which is then transmitted back to the BS. Upon receiving the report, the BS can decide whether to use the particular channel used to transmit the RS for further data communications with the UE device. In a multiple-in-multiple-out (MIMO) system implementing beam forming techniques, wherein multiple directional beams may be used to communicate with a UE device, the BS can use such channel estimation techniques to identify the best beam(s) for communicating with a particular UE device. The RS is also used by a receiving UE device to perform channel estimation measurements such as precoding matrix indicator (PMI) measurements. Thereafter, the UE device generates a report containing the measurement results, which is then transmitted back to the BS. Upon receiving the report, the BS can decide the specific precoding matrix for further data communications with the UE device.

In the 5G NR network, however, it is contemplated that the area coverage of each BS will be smaller than the coverage area of a BS in LTE and as a result the number of BS's in a given area will become larger when compared to current LTE networks. Additionally, it is contemplated that the subcarrier spacing (SCS) in 5G NR networks will increase (e.g., multiple SCS's in the range from 15 KHz to 480 KHz may be supported). This contemplated increase in number of BS's and SCS in 5G NR systems will pose potential problems for generating reference signals for channel estimation, as discussed further below.

A reference signal is generated from a reference signal sequence, which is in turn generated from a pseudo-random number sequence (PRNS) provided by a pseudo-random number generator (PRNG). The PNRG is initialized by an initialization sequence of fixed length L, which is in turn generated by an initialization sequence value (chili), which is in turn dependent on the value of parameters such BS cell ID numbers and SCS. As the number of BS's in a given area increases, the possible values of BS cell ID's also increases proportionally. Thus, $c_{init}$ may become too large (e.g., greater than 2^31, which means 2 to the power of 31), resulting in an initialization sequence length that is larger than L, which is too long to be used by the PRNG to generate the PRNS used to generate the RS sequence. Thus, current techniques for generating a reference signal sequence will not be satisfactory for the contemplated 5N NR networks.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method for generating a reference signal (RS) sequence at a wireless communication device includes: determining an initialization value; limiting the initialization value to be less than a predetermined positive integer M to provide a limited initialization value; mapping the limited initialization value into an initialization sequence having a predetermined number L of sequence values; providing the initialization sequence to a pseudo-random number generator (PRNG) to generate a pseudo-random number sequence (PRNS); and generating the RS sequence based on the PRNS.

In another embodiment, a wireless communication device includes: at least one processor configured to: determine an initialization value; limit the initialization value to be less than a predetermined positive integer M to provide a limited initialization value; and map the limited initialization value into an initialization sequence having a predetermined number L of sequence values; provide the initialization sequence to a pseudo-random number generator (PRNG) to generate a pseudo-random number sequence (PRNS); and generate the RS sequence based on the PRNS; and a transceiver configured to transmit the RS sequence to another wireless communication device.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
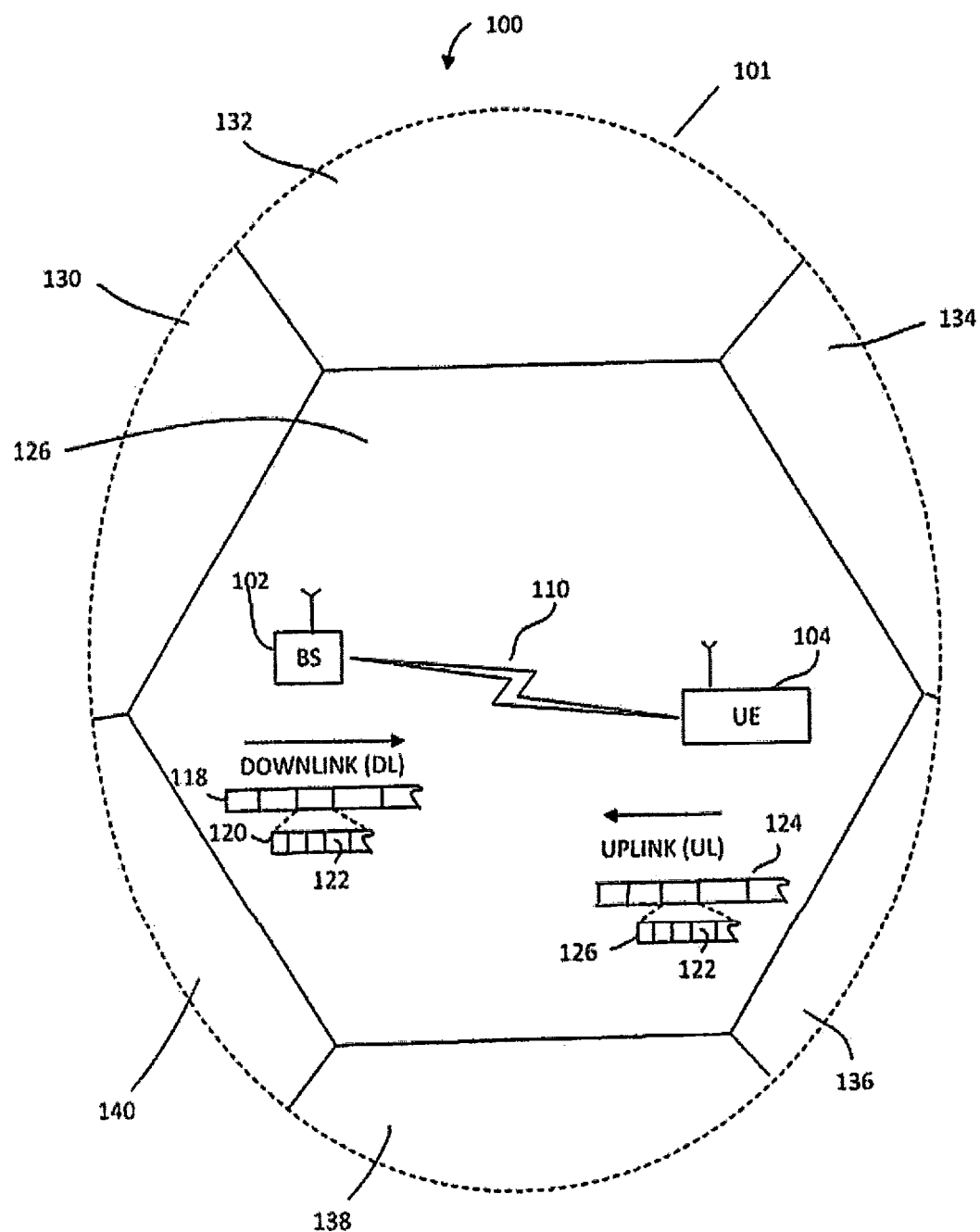
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with various embodiments of the present disclosure. The exemplary communication network 100 includes a base station (BS) 102 and a user equipment (UE) device 104 that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the base station (BS) 102 and user equipment (UE) 104 are described herein as non-limiting examples of "communication devices," generally, which can practice the methods disclosed herein. Such communication devices may be capable of wireless and/or wired communications, in accordance with various embodiments of the invention.

Figure 2:
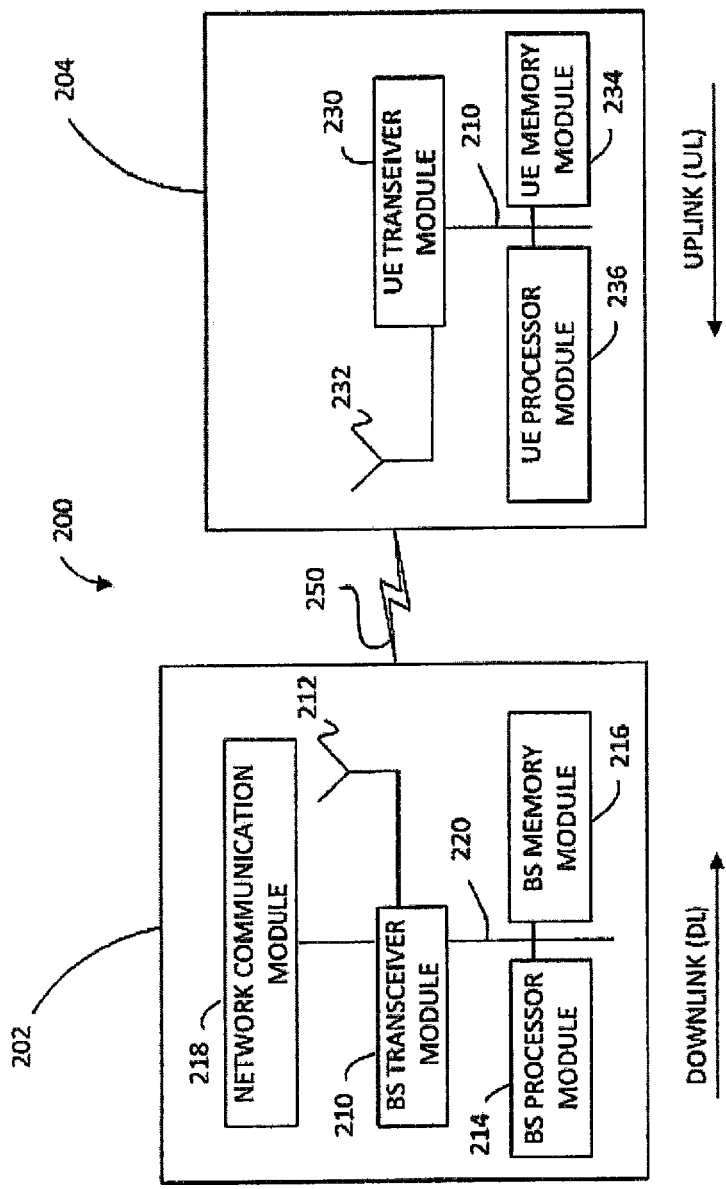
FIG. 2 illustrates block diagrams an exemplary base station and user equipment device, in accordance with some embodiments of the invention.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 and a UE 204. The base station 202 includes a BS transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch (not shown) may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 602 and other network components and communication devices configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, as discussed above, when the BS 102 is preparing to transmit and receive data from the UE 104, a channel estimation process is typically performed before the BS actually transmits and receives the data from the UE 104. During such a channel estimation process, one or more reference signals is typically transmitted from the BS 102 to the UE 104 via one or more physical channels. In alternative embodiments, one or more reference signals can be transmitted from the UE 104 to the BS 102.

Figure 3:
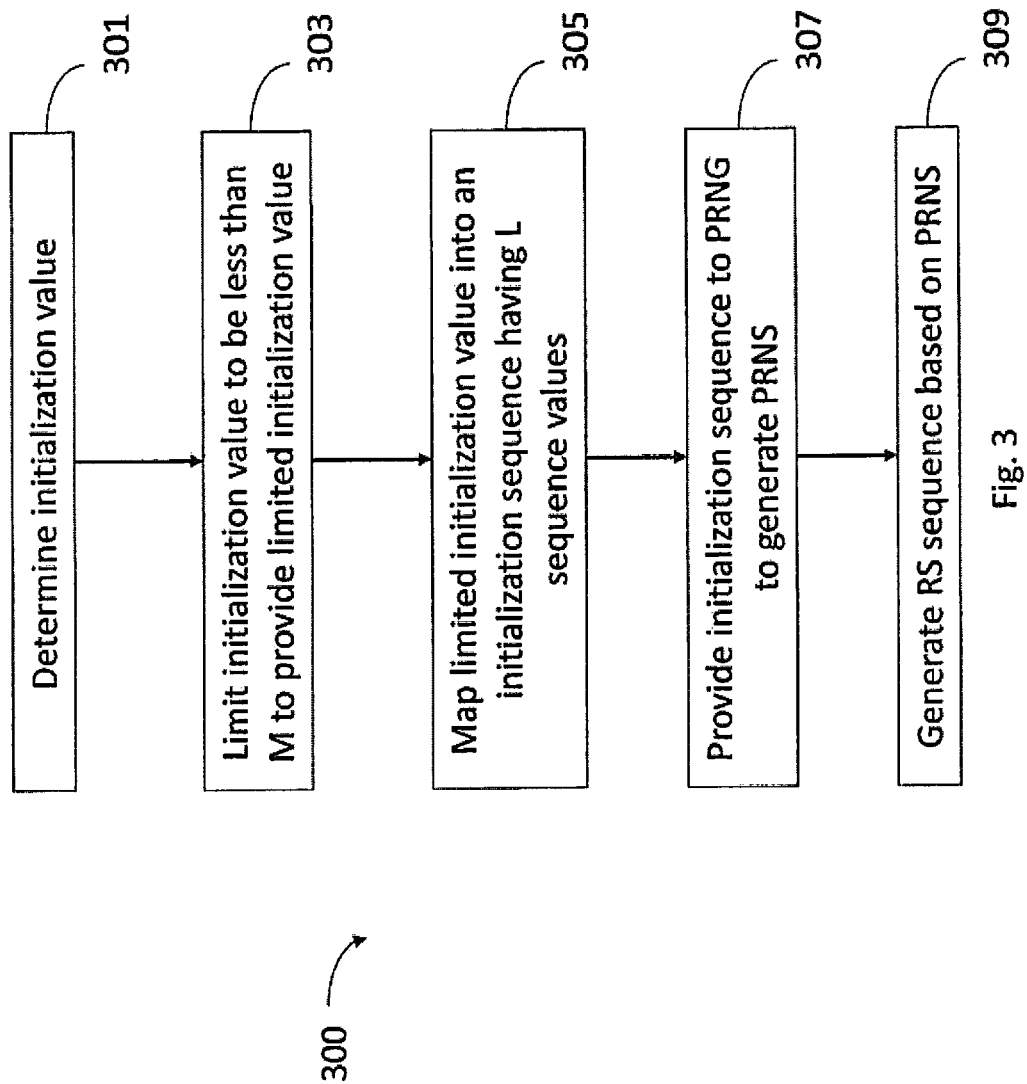
FIG. 3 illustrates a process flow of a procedure for generating a reference signal sequence, in accordance with one embodiment.

FIG. 3 illustrates a flow chart of process 300 of generating a reference signal (RS) sequence, in accordance with some embodiments. At operation 301, an initialization value (e.g., $c_{init}$) is determined. Examples of determining or calculating an initialization value will be discussed in further detail below. Next, at operation 303, the initialization value is limited to be less than a predetermined number M to provide a limited initialization value, where M is a positive integer. Examples of techniques to limit the initialization value to be less than M are discussed in further detail below. Next, at operation 305, the limited initialization value is mapped into an initialization sequence of a predetermined fixed length L in accordance with a predetermined function. Examples of techniques of mapping the limited initialization value are discussed in further detail below. At operation 307, the initialization sequence is provided to a pseudo-random number generator (PRNG) to generate a pseudo-random number sequence (PRNS). At operation 309, the PRNS is used to generate the RS sequence in accordance with conventional techniques.

Figure 4:
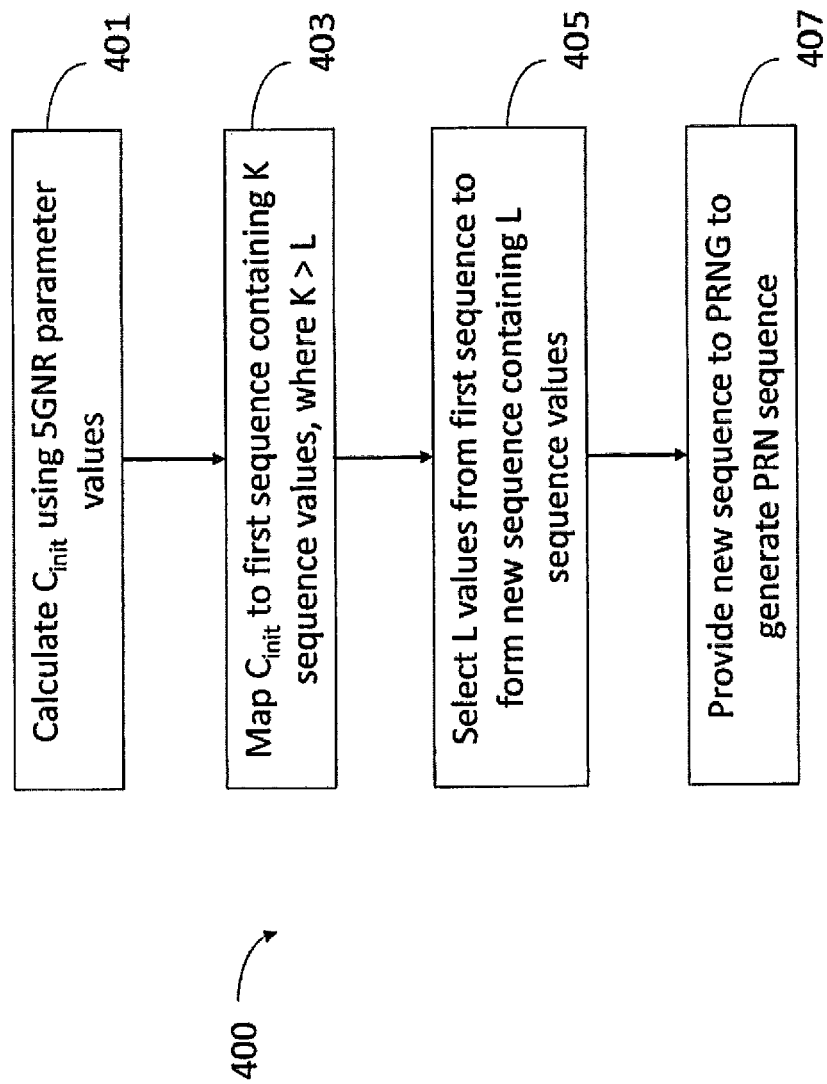
FIG. 4 illustrates a process flow of a procedure for generating an initialization sequence for generating a reference signal sequence, in accordance with another embodiment.

FIG. 4 illustrates a process flow of a process 400 for generating an initialization sequence for generating a reference signal sequence, in accordance with one embodiment. In accordance with some embodiments, a method similar to LTE is implemented for NR CSI-RS sequence generation to randomize the CRI-RS interference between cells. In LTE, as discussed above, the random RS sequence is generated from a pseudo-random number sequence (PRNS), which is in turn generated from a pseudo-random number generator (PRNG). According to some embodiments, the PRNG is initialized with an initialization sequence having a fixed length L.

As discussed above, the initialization sequence is derived from the initialization value ($c_{init}$). In accordance with some embodiments, $c_{init}$ is calculated as follows: $c_{init}=2^{10}\cdot(7\cdot(n_s'+1)+l+1)\cdot(2\cdot N_{ID}^{CSI}+1)+2\cdot N_{ID}^{CSI}+N_{CP}$ at the start of each OFDM symbol, where $c_{init}$ is the initialization value, $n_s'$ is a slot index in a OFDM frame, l is an OFDM index, $N_{ID}^{CSI}$ is an index of cells (or cell IDs), and $N_{CP}$ equals 1 for a normal cyclic prefix (CP) and 0 for an extended CP. The value of $N_{ID}^{CSI}$ equals $N_{ID}^{cell}$ unless configured by higher layers. The range of values of $N_{ID}^{cell}$ is implemented to differentiate cells and to achieve the randomization of the cells. According to some embodiments, the $N_{ID}^{cell}$ value range comes from the value range of Cell ID, which in a 5G NR protocol will have a maximum value of 1007 (e.g., max($N_{ID}$)=1007). In some embodiments, the value of "7" in the equation above can be changed to "14."

It is contemplated that 5G NR networks will support variable Sub-Carrier Spacing (SCS), with a maximum value 120 KHz, for example. Accordingly, the maximum value of $(7\cdot(n_s'+1)+l+1)$ can be 1127, where l is an OFDM index (e.g., an OFDM symbol or sub-carrier index) that is proportional to the SCS. Based on the above initialization value formula max($c_{init}$)=$2^{10}*(1127)*(2*1007+1)+(2*1007+1)=2.3254e+009$, or log 2(max($c_{init}$))=31.1148. According to some embodiments, the initialization sequence $x_2(i)$ is generated using the following series equation: $c_{init}=\Sigma_{i=0}^{30}x_2(i)\cdot 2^i$, where i equals 0 to 30 (i.e., L=31). Thus, the initialization sequence $x_2(i)$ will include 31 initialization values, corresponding to the fixed length of the initialization sequence required by the PRNG, as discussed above. Under this initialization method, however, due to the increased parameter values of $N_{ID}$ and l in 5G NR networks, as discussed above, the maximum value of $c_{init}$ is larger than 2^31, which will result in 32 initialization sequence values. In other words, when using the input parameters of a 5G NR network to calculate $c_{init}$, the maximum value of $c_{init}$ can generate 32 initialization sequence values, while the number of initialization values utilized by the PRNG is only 31.

Referring still to FIG. 4, at operation 401, a maximum value of $c_{init}$ is calculated for a 5G NR network using the equations and input parameters discussed above. Next, at operation 403, the $c_{init}$ value is mapped to a sequence x(i) having K sequence values using the mapping relationship $c_{init}=\Sigma_{i=0}^{K-1}x(i)\cdot 2^i$, where i is an index value from 0 to K-1, K is a positive integer larger than L, and L is the fixed number of sequence values of an initialization sequence to be provided to a PRNG. Next, at operation 405, select L values corresponding to the lowest L index values to form a new sequence containing L sequence values: x(0), x(1), . . . , x(i), . . . , x(L-1). Next at operation 407, the new sequence containing L sequence values is provided as the initialization sequence to the PRNG to generate a PRN sequence. Thereafter, the PRN sequence is used to generate a RS sequence in accordance with conventional techniques. According to some embodiments, the BS processor module 214 (FIG. 2) is configured to perform the operations of the PRNG as well generate the reference signal sequence from the PRN sequence, as described herein. In alternative embodiments, the UE processor module 236 (FIG. 2) can be configured to perform the operations of the PRNG as well generate the reference signal sequence from the PRN sequence, as described herein.

Figure 5:
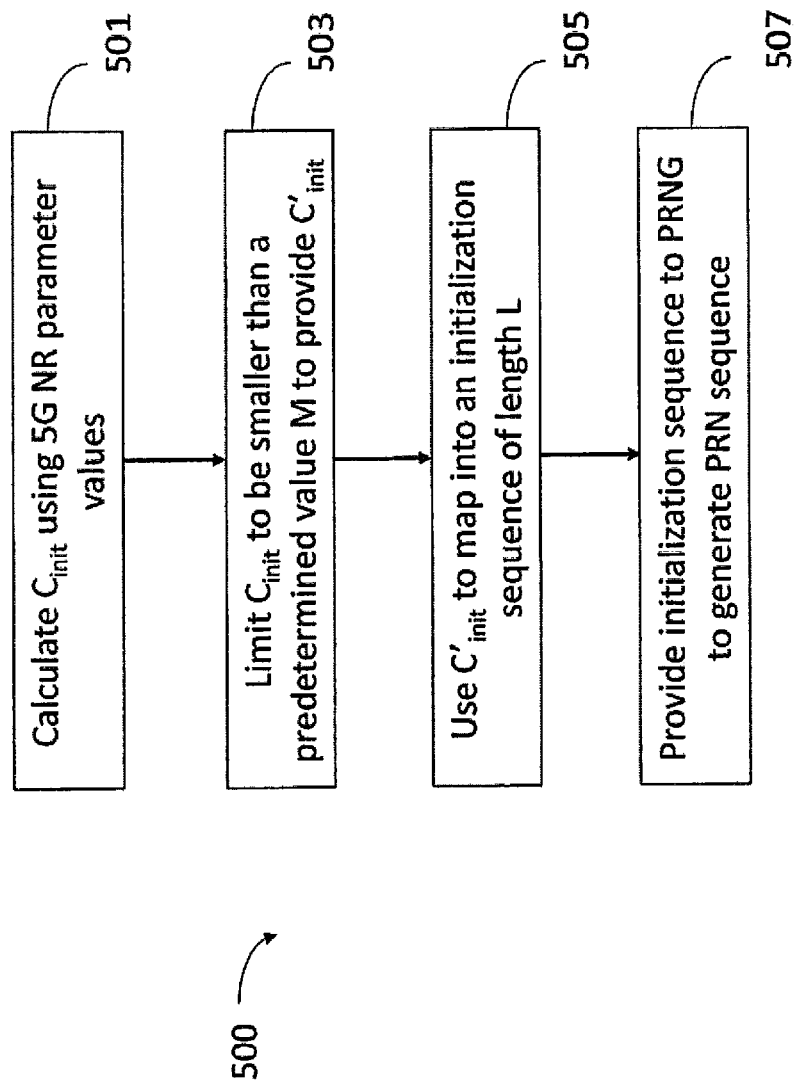
FIG. 5 illustrates a process flow of a procedure for generating an initialization sequence for generating a reference signal sequence, in accordance with a further embodiment.

FIG. 5 illustrates a process flow of a process 500 for generating an initialization sequence for generating a reference signal sequence, in accordance with another embodiment. At operation 501, an initialization value $c_{init}$ is calculated using the parameters of a 5G NR network, as discussed above. At operation 503, the calculated value of $c_{init}$ is limited to be smaller than a predetermined value M to provide a new initialization value $c'_{init}$. In some embodiments, M is set equal to 2^31. In alternative embodiments, M can be set to other values such as 2^L, where L can be 32 or 33, for example. Next, at operation 505, the new initialization value $c'_{init}$ is used to map an initialization sequence of length L: x(0), x(1), . . . x(L-1). At operation 507, the initialization sequence is provided to a PRNG to generate a PRN sequence. Thereafter, a RS sequence can be generated from the PRN sequence using conventional techniques.

Various techniques can be implemented for limiting the value of chill to be lower than M and providing the new initialization value $c'_{init}$ at operation 503 discussed above. For example, in some embodiments, if $c_{init}<M$, then $c'_{init}=c_{init}$; if $c_{init}>=M$, then $c'_{init}=M-1$. As another example, according to some embodiments, $c'_{init}$ is determined based on the equation: $c'_{init}=\text{mod}(c_{init}, M)$; wherein mod($c_{init}$, M) represents the modulo operation of $c_{init}$ and M, which returns the remainder after $c_{init}$ is divided by M. According to alternative embodiments, $c'_{init}=\text{floor}(c_{init}*M/(U+1))$, where '*' is a multiplication function and '/' is division function; wherein U is the largest possible value of the input parameter $c_{init}$, and the function floor(a) is equal to the integer part of a. After determining $c'_{init}$ in accordance with any one of the above techniques, $c'_{init}$ is then mapped into an initialization sequence of length L at operation 505, where the mapping is performed according to the mapping relationship: $c'_{init}=\Sigma_{i=0}^{L-1}x(i)\cdot 2^i$.

Figure 6:
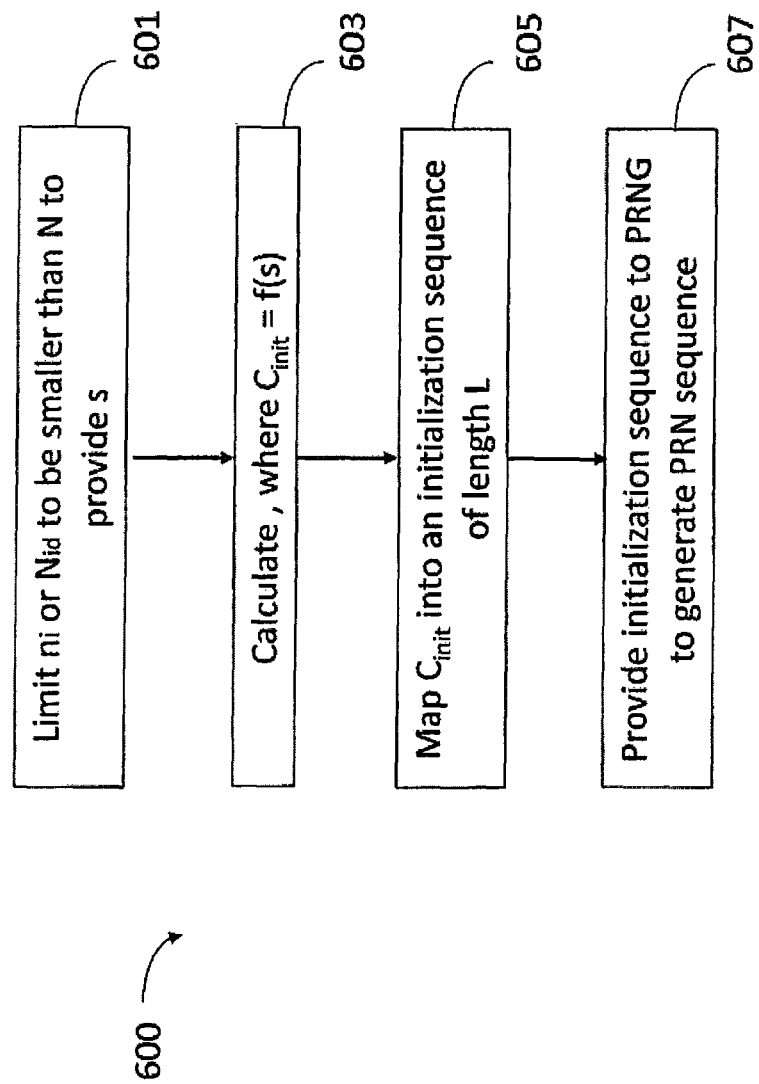
FIG. 6 illustrates a process flow of a procedure for generating an initialization sequence for generating a reference signal sequence, in accordance with yet another embodiment.

FIG. 6 illustrates a process flow of a process 600 for generating an initialization sequence for generating a reference signal sequence, in accordance with another embodiment. At operation 601, an input parameter such as the slot index $n_i$ or $N_{ID}$ is limited to be smaller than a predetermined value N to provide a new limited value s in a 5G NR network. At operation 603, the value s is used to generate the initialization value $c_{init}$. For example, if $n_i$ is the parameter to be limited, N can be set to 10 (in case 14 OFDM symbols in a slot) or 20 (in case 7 OFDM symbols in a slot) according the OFDM symbol number in a slot. The limited parameter s is then used to generate the initialization value $c_{init}=f(s)$, where f(s) is a predetermined function of s. At operation 605, the value $c_{init}$ is mapped into an initialization sequence of length L. Next, at operation 607, the initialization sequence is provided to a PRNG to generate a PRN sequence. Thereafter, a RS sequence can be generated from the PRN sequence using conventional techniques.

Various techniques can be implemented for limiting the value of an input parameter (e.g., $n_i$ or $N_{ID}$) to be lower than N and providing the new initialization value s at operation 601, as discussed above. For example, in some embodiments, if $n_i<N$, then $n'_i=n_i$; if $n_i>=N$, then $n'_i=N-1$. As another example, according to some embodiments, $n'_i$ is determined based on the equation: $n'_i=\text{mod}(n_i, N)$; wherein mod($n_i$, M) represents the modulo operation of $n_i$ and N, which returns the remainder after $n_i$ is divided by N. According to alternative embodiments, $n'_i=\text{floor}(n_i*N/(U+1))$; wherein U is the largest possible value of the input parameter $n_i$, and the function floor(a) is equal to the integer part of a.

In accordance with some embodiments, the maximum value of $c_{init}$ is limited to 2^31. Or alternatively, according to some embodiments, $$c'_{init}=2^{10}\cdot(7\cdot(n_s'+1)+l+1)\cdot(2\cdot N_{ID}^{CSI}+1)+2\cdot N_{ID}^{CSI}+N_{CP}$$

$$c_{init}=\mathrm{mod}(c'_{init},2^{31}),$$

which results in a value of $c_{init}$ that will generate an initialization sequence corresponding to the first 31 sequence values generated by $c'_{init}$. According to some alternative embodiments, the value of $c_{init}$ is limited by limiting the value of $n_s'$ as follows: $n_s'=\mathrm{mod}(n_s, 20)$. Thus, the value of $c_{init}$ can be limited to a maximum value of 2^31, such that the resulting initialization sequence will contain only 31 sequence values.

According to some other embodiments, a new modified value of $c_{init}$ is calculated as follows:

$$c'_{init}=2^{10}\cdot(7\cdot(n_s'+1)+l+1)\cdot(2\cdot N_{ID}^{CSI}+1)+2\cdot N_{ID}^{CSI'}+N_{CP}, \text{ where}$$

$N_{ID}^{CSI'}=\mathrm{mod}(N_{ID}^{CSI},504)$. The resulting $c'_{init}$ value can then be used to generate an initialization sequence that contains only 31 initialization sequence values.

According to alternative embodiments, instead of $c_{init}$, an input parameter u may represent time. For example, the input parameter u can be an index value from an index of time intervals. In accordance with some embodiments, the index of time intervals can be an index of slots in a frame, or an index of OFDM symbol in a slot. In other embodiments, it may be an index value from an index of orthogonal frequency division multiplexing (OFDM) symbols, as known in the art. Alternatively, the input parameter may be determined as a predetermined function of the index of the time interval, in accordance with some embodiments. In some other embodiments, the input parameter is a function of the time interval index of OFDM symbols. One example of such functions is provided by $u=7(n_s+1)+l+1$, where u is the input parameter, $n_s$ is the slot index, and l is the OFDM index.

Figure 7:
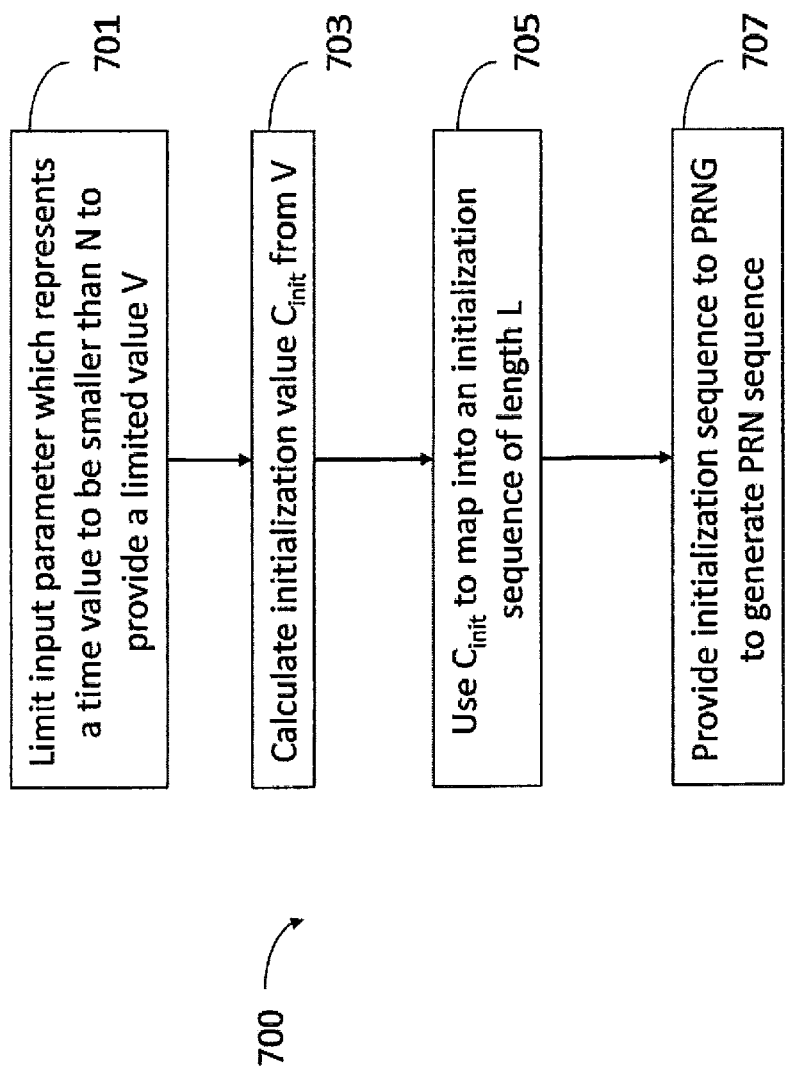
FIG. 7 illustrates a process flow of a procedure for generating an initialization sequence for generating a reference signal sequence, in accordance with a further embodiment.

FIG. 7 illustrates a flow chart for a process 700 using an input parameter which represents time to generate a limited initialization value, which is then used to generate an initialization sequence for generating a RS sequence, in accordance with some embodiments. At step 701, an input parameter which represents a time value is limited to be smaller than a predetermined value N. In some embodiments, N is a function of the number of OFDM symbols contained in a specified slot. According to some embodiments, for example, if the slot contains T OFDM symbols, then N=20*7/T; for example, if T=7, then N=20; or if T=14, then N=10.

In other embodiments, N is the number of the values, which are used by the time input parameters. According to some embodiments, for example, the values of time input parameters are $\{u_0, u_1, \ldots, u_{Q-1}\}$, where Q is the number of these values, and N is equal to Q. According to some embodiments, the input parameter value u can be limited to be less than N, for example, by performing a modulus operation using u and N as follows: $v=\mathrm{mod}(u, N)$, as discussed above. The resulting value of v is then used to generate the initialization value $c_{init}$. The initialization value $c_{init}$ is mapped into an initialization sequence of a predetermined length (L, for example), which can then be used to generate a RS sequence as discussed above.

After the value of the input parameter that represents time is limited to be smaller than N in step 701, at step 703, the thus limited input parameter V is used to calculate an initialization value $c_{init}$. Next, at operation 705, the initialization value $c_{init}$ is mapped into an initialization sequence having a predetermined length L. Next, at step 707, the initialization sequence is provided to a PRNG to generate a PRN sequence. Thereafter, a RS sequence can be generated from the PRN sequence using conventional techniques.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations.

Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for generating a reference signal at a wireless communication device, the method comprising:
   limiting an initialization value to be less than a predetermined positive integer M to provide a limited initialization value;
   mapping the limited initialization value into an initialization sequence having a predetermined number L of sequence values;
   providing the initialization sequence to a pseudo-random number generator to generate a pseudo-random number sequence; and
   generating the reference signal based on the pseudo-random number sequence, wherein L equals a number of elements in the initialization sequence provided to the pseudo-random number generator, and M is equal to 2 to the power of L.

2. The method of claim 1 wherein limiting the initialization value comprises limiting an input parameter used to calculate the initialization value to be less than a predetermined integer N.

3. The method of claim 2 wherein the input parameter represents a time value.

4. The method of claim 2 wherein the limited input parameter value is calculated based on a modulus operation performed on the input parameter value and N.

5. The method of claim 2 wherein the input parameter comprises a cell index.

6. A wireless communication device configured to generate a reference signal, the wireless communication device comprising:
   at least one processor configured to:
   limit an initialization value to be less than a predetermined positive integer M to provide a limited initialization value;
   map the limited initialization value into an initialization sequence having a predetermined number L of sequence values;
   provide the initialization sequence to a pseudo-random number generator to generate a pseudo-random number sequence; and
   generate the reference signal based on the pseudo-random number sequence, wherein L equals a number of elements in the initialization sequence provided to the pseudo-random number generator, and M is equal to 2 to the power of L.

7. The wireless communication device of claim 6 wherein limiting the initialization value comprises limiting an input parameter used to calculate the initialization value to be less than a predetermined integer N.

8. The wireless communication device of claim 7 wherein the input parameter represents a time value.

9. The wireless communication device of claim 7 wherein the limited input parameter value is calculated based on a modulus operation performed on the input parameter value and N.

10. The wireless communication device of claim 7 wherein the input parameter comprises a cell index.

\* \* \* \* \*